(12) United States Patent
Vallati (10) Patent No.: US 11,971,362 B2
(45) Date of Patent: Apr. 30, 2024

(54) APPARATUS AND METHOD FOR INSPECTING TRANSPARENT CYLINDRICAL CONTAINERS CONTAINING TRANSPARENT OR SEMI-TRANSPARENT VISCOUS OR GEL PRODUCTS, IN PARTICULAR FOR MEDICAL APPLICATIONS

(71) Applicant: NUOVA OMPI S.R.L., Piombino Dese (IT)

(72) Inventor: Luca Vallati, Mira (IT)

(73) Assignee: NUOVA OMPI S.R.L., Piombino Dese (IT)

( * ) Notice: Subject to any disclaimer, the term of this patent is extended or adjusted under 35 U.S.C. 154(b) by 0 days.

(21) Appl. No.: 17/540,784

(22) Filed: Dec. 2, 2021

(65) Prior Publication Data
US 2022/0196566 A1 Jun. 23, 2022

(30) Foreign Application Priority Data
Dec. 18, 2020 (IT) .................. 102020000031394

(51) Int. Cl.
*G01N 21/90* (2006.01)
*G01N 21/88* (2006.01)
(Continued)

(52) U.S. Cl.
CPC .......... *G01N 21/90* (2013.01); *G06T 7/0004* (2013.01); *H04N 23/56* (2023.01); *G01N 2021/8887* (2013.01); *G06T 2207/10016* (2013.01)

(58) Field of Classification Search
CPC ........... G01N 21/90; G01N 2021/8887; G01N 21/952; G01N 21/9018; G06T 7/0004; G06T 2207/10016; H04N 23/56
See application file for complete search history.

(56) References Cited

U.S. PATENT DOCUMENTS 9,710,731 B2 * 7/2017 Fukuda ............. G01N 21/9018
10,337,977 B1 7/2019 Kuhn et al.
(Continued)

FOREIGN PATENT DOCUMENTS

WO 2012/046136 A1 4/2012
WO 2018/044328 A1 3/2018

OTHER PUBLICATIONS

Search Report for IT2020000031394 dated Aug. 26, 2021.

*Primary Examiner* — Richard A Hansell, Jr.
(74) *Attorney, Agent, or Firm* — ArentFox Schiff LLP; Michael Fainberg (57) ABSTRACT

An apparatus for inspecting transparent cylindrical containers containing transparent or semi-transparent viscous or gel products, comprising a support and/or gripping device for a cylindrical container suitable for supporting and making it rotate about a vertical rotation axis, a video camera that captures images of a window of a side wall of the cylindrical container, a lighting device placed opposite the video camera with respect to the cylindrical container, a control unit that controls the rotation of the cylindrical container at constant angular speed about the vertical rotation axis and controls the activation of the video camera to acquire 'n' images of said window for 'n' regular angular intervals, identify points of said images which may be catalogued as impurities, and classify whether the impurity identified is external to the container.

13 Claims, 4 Drawing Sheets

(51) Int. Cl.
*G06T 7/00* (2017.01)
*H04N 23/56* (2023.01)

(56) References Cited

U.S. PATENT DOCUMENTS

| | | | |
|---|---|---|---|
| 10,393,670 B1* | 8/2019 | Sones | G01N 21/909 |
| 2005/0248765 A1* | 11/2005 | Budd | G01N 15/1459 |
| | | | 356/427 |
| 2006/0208172 A1* | 9/2006 | Akkerman | G01N 21/9027 |
| | | | 250/223 B |
| 2008/0230720 A1* | 9/2008 | Nielsen | G01N 21/9027 |
| | | | 250/492.1 |
| 2014/0268123 A1* | 9/2014 | Juvinall | G01N 21/90 |
| | | | 356/239.4 |
| 2016/0072993 A1* | 3/2016 | Hartrumpf | G06T 7/40 |
| | | | 348/92 |
| 2021/0348999 A1* | 11/2021 | Kato | G01N 15/1012 |
| 2022/0057336 A1* | 2/2022 | Pearson | H04N 23/74 |

* cited by examiner

APPARATUS AND METHOD FOR INSPECTING TRANSPARENT CYLINDRICAL CONTAINERS CONTAINING TRANSPARENT OR SEMI-TRANSPARENT VISCOUS OR GEL PRODUCTS, IN PARTICULAR FOR MEDICAL APPLICATIONS

CROSS-REFERENCE TO RELATED APPLICATION

This application claims priority to Italian Patent Application No. 102020000031394 filed on Dec. 18, 2020, the entire contents of which is hereby incorporated in its entirety by reference.

FIELD OF INVENTION

The present invention relates to an apparatus and a method for inspecting transparent cylindrical containers containing transparent or semi-transparent viscous or gel products, in particular for medical applications.

PRIOR ART

As is known, in the medical sector it is essential to analyze the transparent containers of medical substances in order to detect the presence of any impurities inside the container itself. In the event of a positive result, the container must obviously be discarded because it is not acceptable for the medical substance to contain any type of pollutant.

The systems used in the art are of the optical type and make use of video cameras that scan each container in order to identify any contaminants. However, known systems have some drawbacks.

In fact, the known optical systems, although capable of identifying the presence of a contaminant/impurity, are unable to reliably discriminate whether the position of said contaminants is internal or external with respect to the container. Obviously, in this case, the container must be discarded only if the contaminant is internal, i.e. in contact with the medical substance contained therein.

Obviously, for safety reasons, known systems are calibrated so as to be "conservative": in this way, high positive rejections are obtained. To at least partially obviate this drawback, the inspection times of the containers are extended but in this way, if on the one hand false rejections are reduced, on the other hand the inspection times and costs increase in an unacceptable manner.

It should be borne in mind that inspection times are a non-negligible cost factor since the batches to be checked may include several tens of thousands of containers.

Therefore, the known solutions do not allow low positive rejections and reduced inspection times to be obtained at the same time.

SUMMARY OF THE INVENTION

The need of solving the drawbacks and limitations mentioned with reference to the prior art is therefore felt.

Such need is met by an apparatus for inspecting transparent cylindrical containers containing transparent or semi-transparent viscous or gel products, in particular for medical applications according to claim 1, and by a method for inspecting transparent cylindrical containers containing transparent or semi-transparent viscous or gel products, in particular for medical applications, according to claim 9.

BRIEF DESCRIPTION OF THE DRAWINGS

Further features and advantages of the present invention will become more apparent from the following description of preferred and non-limiting embodiments thereof, in which.

Elements or parts of elements common to the embodiments described hereinafter will be indicated with the same numerical references.

DETAILED DESCRIPTION

With reference to the aforementioned figures, the reference numeral 4 globally indicates an apparatus for inspecting transparent cylindrical containers 8 containing transparent or semi-transparent viscous or gel products, in particular for medical applications.

It should be pointed out that the cylindrical containers 8 are transparent, so as to allow viewing from the outside of the substances, preferably transparent or semi-transparent viscous or gel, contained therein.

Therefore, said cylindrical containers 8 are preferably made of glass or plastic, such as for example Plexiglas.

Furthermore, the cylindrical containers 8 have an axisymmetry axis X-X; in other words, they are solids of rotation around said axisymmetry axis X-X.

Said inspection apparatus 4 comprises a support and/or gripping device (not shown) for a cylindrical container 8, suitable for supporting it and provided with means for making it rotate about a vertical rotation axis Y-Y, coincident with the cylindrical axisymmetry axis X-X of said cylindrical container 8.

For the purposes of the present invention, it is possible to use a plurality of support and/or gripping devices for the cylindrical containers 8; care should be taken so that said support and/or gripping devices do not prevent the vision and therefore the verification of any impurities on the cylindrical container 8. For this purpose, support and gripping devices are preferred which grasp or in any case rotate the containers from their support base. There is a multitude of gripping devices/methods suitable for this purpose. For example, it is possible to implement a bottom-head grip of the bottle or by pliers at the neck of the bottle itself, etc. The important thing is that these devices rotate the cylindrical container around their main axis.

The apparatus 4 further comprises a video camera 12 directed so as to frame and capture images, for example in the form of pixels, of a window 16 of a side wall 20 of the cylindrical container 8.

Obviously, due to the fact that the cylindrical container 8 is transparent, the video camera 12 is able to capture images not only of the side wall 20 of the cylindrical container 8 but also of its contents (preferably transparent or semi-transparent viscous or gel products). The object of the present invention is in fact to detect the presence of impurities and then to distinguish whether such possible impurities are outside, i.e. on an external surface 22 of the side wall 20, or inside, i.e. on an internal surface 23 of the side wall 20 of the cylindrical container 8. If the impurity is on the internal surface 23, then it will be in direct contact with the viscous or gel products contained in the cylindrical container 8 which must necessarily be discarded.

Said side wall 20 has a thickness equal to the difference between an outer radius Re, i.e. a radius of the outer surface 22 of the side wall 20, with respect to the cylindrical axisymmetry axis X-X, and an inner radius Ri, i.e. a radius of the inner surface 23 of the side wall 20.

The apparatus 4 further comprises a lighting device 24, placed opposite the video camera 12 with respect to the cylindrical container 8, so as to back-light said cylindrical container 8, opposite the video camera 12.

The lighting device 24 is, for example, a flat lighting panel.

The apparatus 4 further comprises a control unit 32 operatively connected to the support and/or gripping device and to the video camera 12, and programmed to:

control the rotation of the cylindrical container 8 by means of the support and/or gripping device at constant angular speed around the vertical rotation axis Y-Y (FIGS. 2-3), control the activation of the video camera 12 so as to acquire 'n' images of said window 16, for a predetermined number 'n' of regular angular intervals $\Delta\theta$, identify points (Pi) of said images which can be catalogued as impurities, measure a median displacement $\Delta S_{med}$ of each of said points Pi during said regular angular intervals $\Delta\theta$ and comparing it to a discriminating value equal to the product of the internal radius Ri of the cylindrical container 8 for said regular angular intervals $\Delta\theta$, classify the impurity identified by the point Pi as external to the container 8 if said median displacement $\Delta S_{med}$ of the point Pi is greater than said discriminating value and vice versa.

Preferably, the control unit 32 is operatively connected to the lighting device 24, so as to be able to control the switching on thereof, coordinating it with the angular rotation of the cylindrical container 8.

According to a possible embodiment, the support and/or gripping device is provided with a rotary encoder to measure the rotation of the cylindrical container 8. Preferably, said rotary encoder is operatively connected to the control unit 32 to measure the median displacement $\Delta S_{med}$ of each of said points Pi.

According to a preferred embodiment (FIGS. 5-6), the control unit 32 is programmed so as to place a focal plane of the video camera 12 on the side wall 20 of the cylindrical container 8 opposite the video camera 12, i.e., on the side of the lighting device 24, in such a way as to exploit the lens or magnification effect M, due to the presence, inside the cylindrical container 8, of any transparent product having a refractive index different from the refractive index of air.

In particular, said lens effect is equal to $M=f/(f-s)$ wherein $f=nl/2(nl-1)^2$ where nl is the refractive index of the viscous product contained in the cylindrical container (8), where 's' is equal to said outer radius Re of the cylindrical container 8, and wherein the video camera 12 is placed at a distance 'f' from the cylindrical axisymmetry axis X-X of said cylindrical container 8, opposite the lighting device 24.

Figure 6:
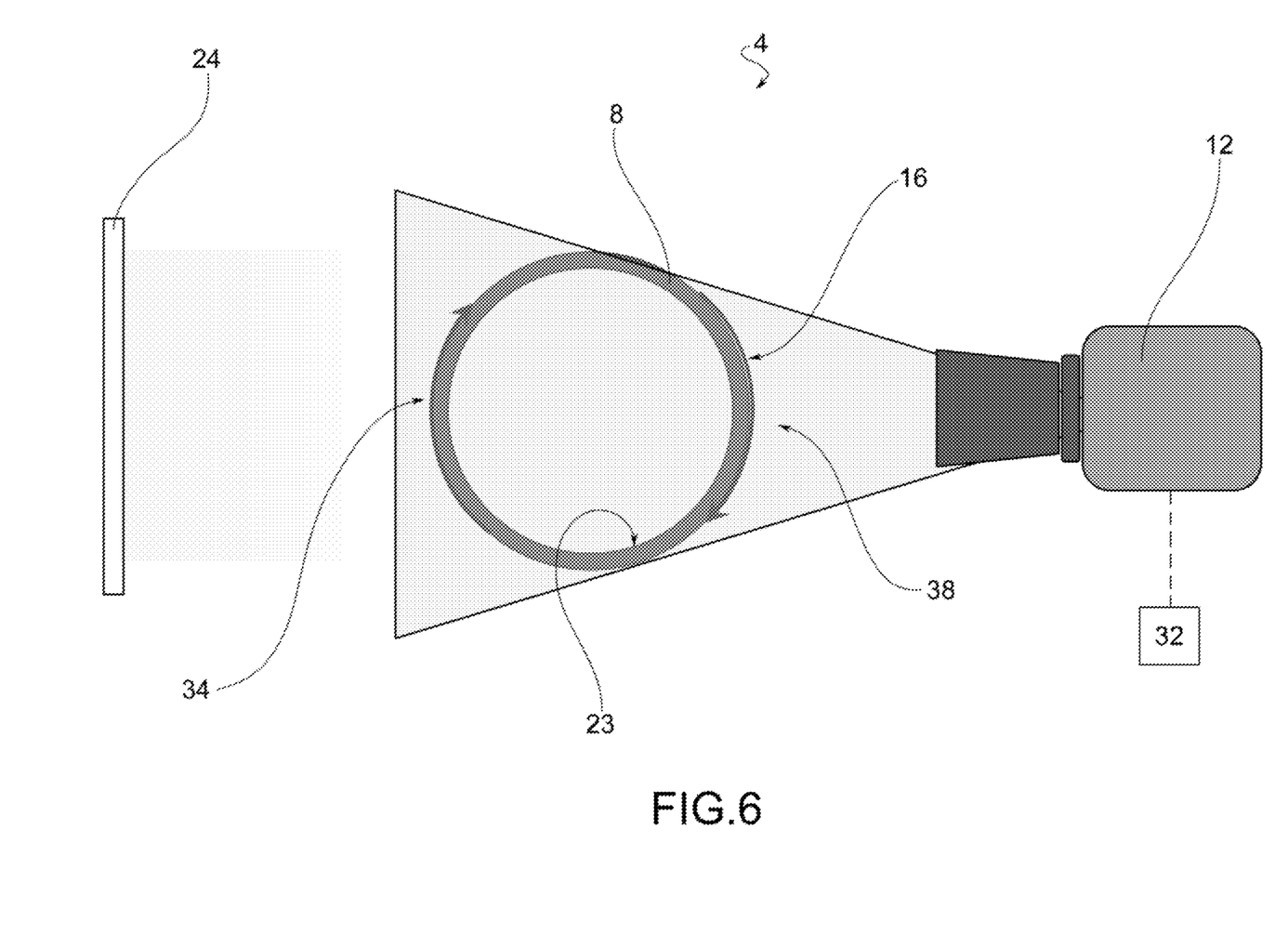
FIG. 6 shows a fifth schematization from above of an inspection apparatus according to the present invention, in successive inspection steps, as well as of the operating principles of said inspection apparatus, as better described below.

Preferably, the control unit 32 is programmed to measure only the trajectories inherent to points Pi on the side of the cylindrical container 8 opposite the video camera 12 and facing the lighting device 24 (FIG. 6).

The angular intervals with which the linear video camera scans the extension of the container 8 depend on the resolution, in the extension direction of the container itself, to be applied. A value for said angular intervals may be, by way of example, equal to 0.044 degrees, obtained by dividing the 360° rotation angle of the container by 8192 encoder pulses (360°/8192).

The regular angular intervals are therefore, by way of example, angular intervals of 0.05 sexagesimal degrees.

The operation of the inspection apparatus according to the present invention shall now be described.

In particular, the principle on which the present invention is based starts from the assumption that a contaminant attached to the outer surface 22 of the side wall 20, if rotated, will travel a greater distance than that traveled by a contaminant attached to the inner surface 23 of the side wall or in any case arranged in suspension inside the cylindrical container 8.

In particular, it is essential to identify a certain criterion that allows contaminants contained inside the container 8 to be discriminated from those attached to the outer surface 22 of the container 8 itself.

Figure 1:
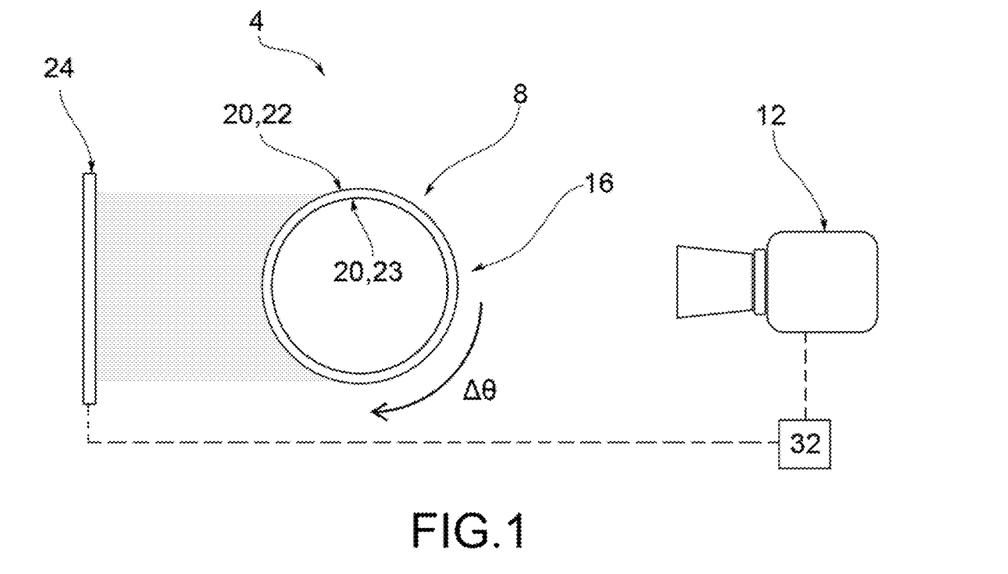
FIG. 1 represents a schematic top view of an apparatus for inspecting transparent cylindrical containers containing transparent or semi-transparent viscous or gel products according to an embodiment of the present invention.

The cylindrical container 8 is placed in front of the video camera 12 in a vertical position and made to rotate around the vertical rotation axis Y-Y, parallel and coincident with the cylindrical axisymmetry axis X-X, at constant angular speed. The cylindrical container 8 is in the meantime backlit by the lighting device 24, for example a flat LED illuminator, placed on the opposite side of the video camera 12 (FIG. 1).

During the rotation of the container, the camera captures images at constant angular intervals $\Delta\theta$.

Figure 2:
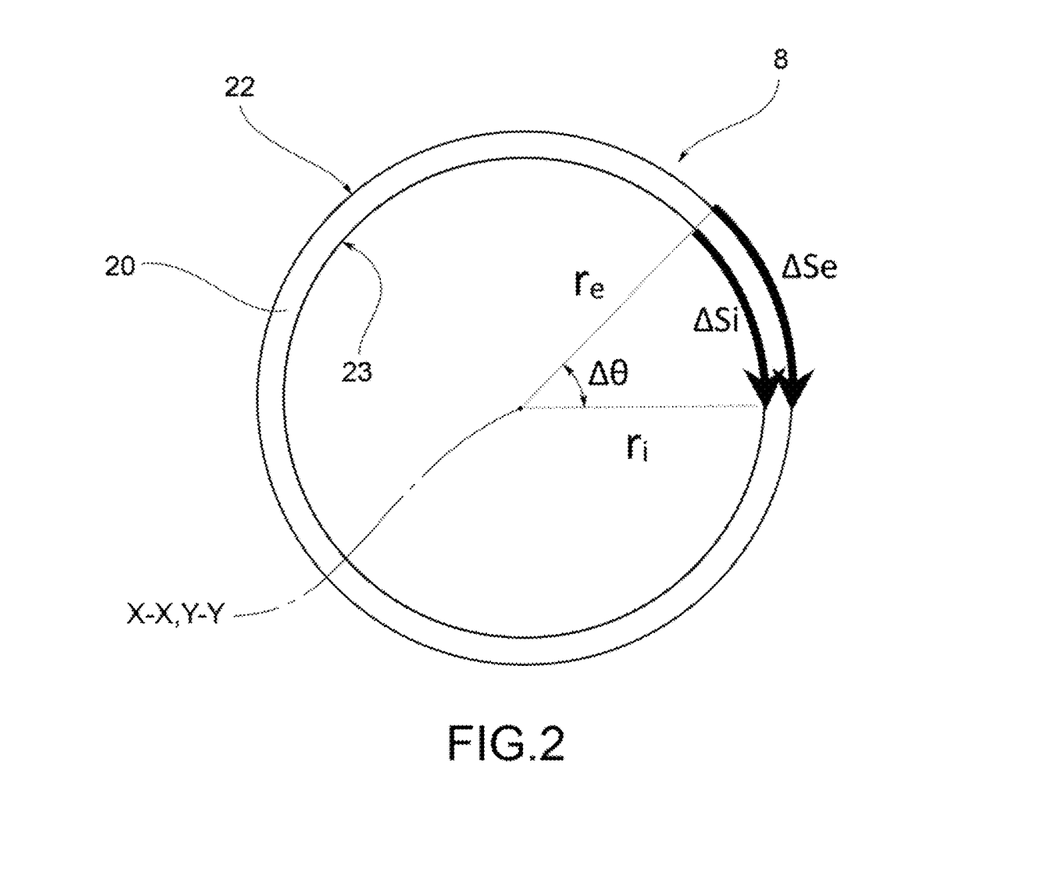
FIG. 2 shows a first schematization from above of an inspection apparatus according to the present invention, in successive inspection steps, as well as of the operating principles of said inspection apparatus, as better described below.

Here are some geometries of the system (schematically illustrated in FIG. 2):

ri: radius of the inner surface 23 of the cylindrical container 8;

re: radius of the outer surface 22 of the cylindrical container 8;

$\Delta Si=ri*\Delta\theta$ is the space traveled by an object placed on the outer surface 22 of the cylindrical container 8 at an angular variation $\Delta\theta$;

$\Delta Se = re*\Delta\theta$ is the space traveled by an object placed on the inner surface 23 of the cylindrical container 8 at an angular variation $\Delta\theta$.

To discriminate an internal object from one external to the cylindrical container 8 it is sufficient to evaluate the space traveled by the object (i.e. by the impurity) at each fixed angular variation.

With the same angular variation $\Delta\theta$, having set ri<re, we will have $\Delta Se > \Delta Si$.

An object contained within the cylindrical container 8 will have a radius of rotation (distance from the rotation axis) which will range from 0, in the case of an object perfectly aligned, to ri, when the object is in contact with the inner surface 23 of the cylindrical container 8.

An object on the outer surface 22 of the cylindrical container 8 will have a radius of rotation (distance from the rotation axis) equal to re.

As a consequence of an angular displacement $\Delta\theta$, an object inside the cylindrical container 8 will have undergone a displacement:

$$\Delta Si <= ri*\Delta\theta.$$

On the contrary, an object on the outer surface 22 of the cylindrical container 8 will undergo a displacement equal to:

$$\Delta Se = re*\Delta\theta.$$

The difference between the two displacements, in the worst case in which an object in contact with the inner surface 23 must be distinguished from one in contact with the outer surface 22, is equal to $\Delta Se - \Delta Si = (re-ri)*\Delta\theta$ the variation, with the same angular displacement, is therefore equal to re−ri, therefore to the thickness of the side wall 20 of the cylindrical container 8.

The video camera 12 will capture (n) images in sequence every $\Delta\theta$ degrees through the use of a rotary encoder connected to the motor which rotates the container.

It therefore remains to evaluate the displacement $\Delta S$ of a contaminant that has undergone a displacement. For this reason, a tracking algorithm has been implemented which deals with relating the positions of the same object at different instants, thus tracing the movement trajectory thereof.

The trajectory of the moving contaminant will contain the positions of the latter in the different images.

Having set p, a subset of n, the captured images in which the object is visible from the camera: 1, 2, . . . , p, in the instants: t1, t2, . . . , tp We will therefore have:
$\Delta S1$: displacement of the object in the transition from image 1 to image 2
$\Delta S2$: displacement of the object in the transition from image 2 to image 3
$\Delta Sp-1$: displacement of the object in the transition from image p−1 to image p At this point we will calculate the median value $\Delta Smed$ of all $\Delta S1$ . . . p−1, of each moving object.

It is known by construction that, given an angular displacement $\Delta\theta$, no object inside the cylindrical container 8 will be able to undergo a displacement greater than $\Delta Si = ri*\Delta\theta$.

Therefore, any contaminant whose trajectory will have a median value $\Delta Smed$ of the displacements in the various instants greater than $\Delta Si = ri*\Delta\theta$ will be marked as an "external contaminant".

Whereby if:
$\Delta Smed > \Delta Si = ri*\Delta\theta \Rightarrow$ then the contaminant is external to the cylindrical container 8.

Figure 3:
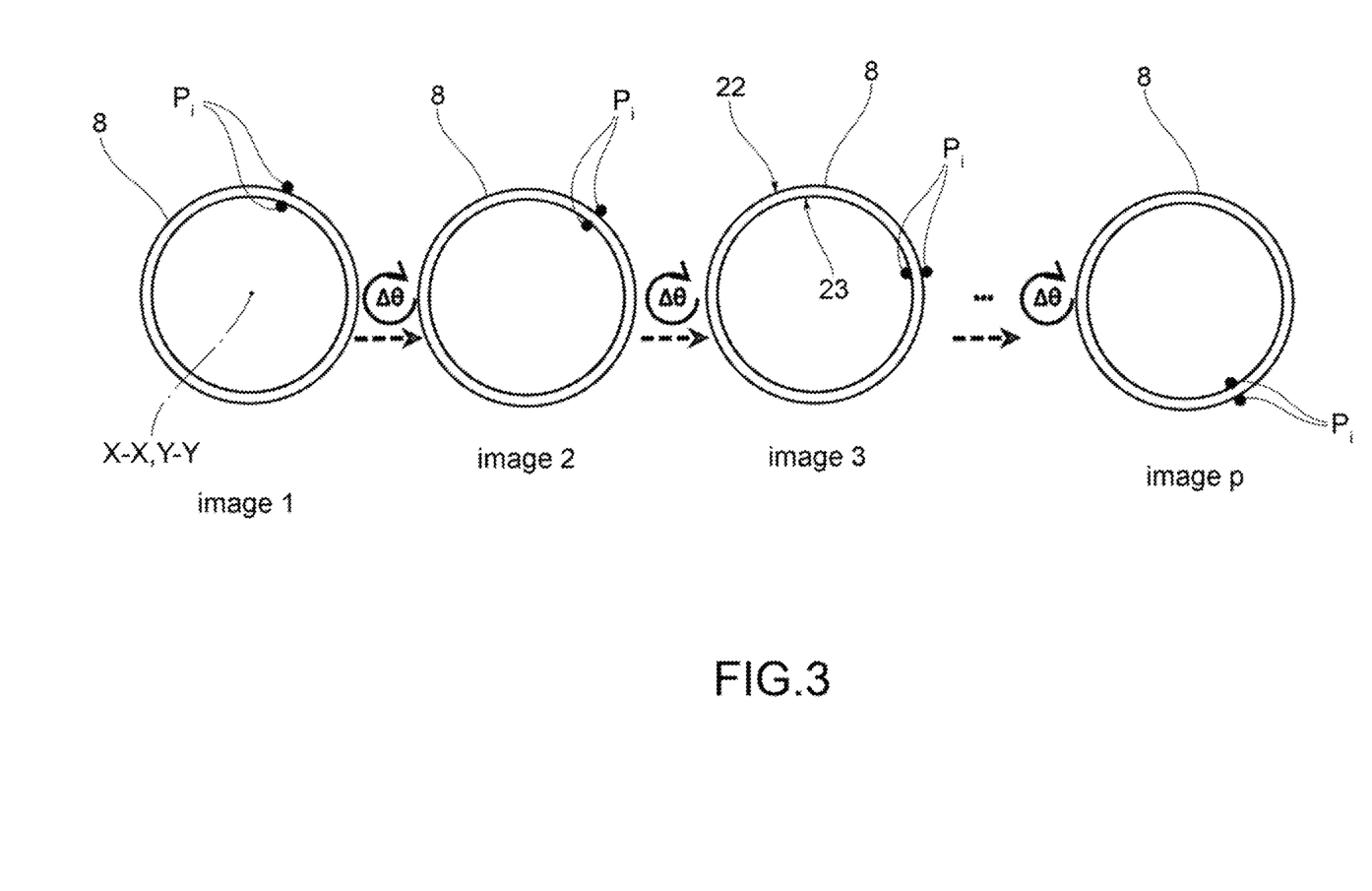
FIG. 3 shows a second schematization from above of an inspection apparatus according to the present invention, in successive inspection steps, as well as of the operating principles of said inspection apparatus, as better described below.

A limiting example, in which the internal contaminant is precisely in contact with the inner surface 23 of the side wall 20 of the cylindrical container 8 is illustrated in FIG. 3.

Figure 4:
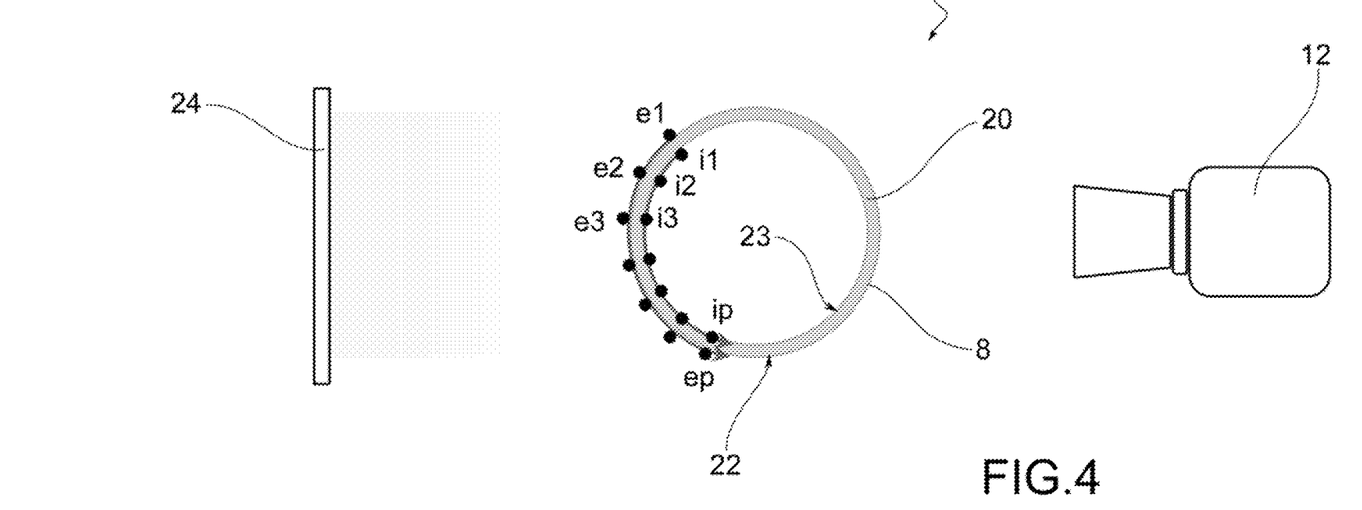
FIG. 4 shows a third schematization from above of an inspection apparatus according to the present invention, in successive inspection steps, as well as of the operating principles of said inspection apparatus, as better described below.

Possible trajectories calculated for an internal contaminant (i) and an external contaminant (e) are illustrated in FIG. 4, where i1, i2, i3, . . . , ip are the positions at various instants of the internal contaminant, while e1, e2, e3, . . . , and p are the positions of the external contaminant at various instants.

It will therefore result:

$$\Delta Simed <= \Delta Si = ri*\Delta\theta$$

$$\Delta Semed = \Delta Se = re*\Delta\theta$$

The difference between $\Delta Simed$ and $\Delta Semed$ is equal to $\Delta Se - \Delta Si = (re-ri)*\Delta\theta$.

Obviously, this difference is particularly small, since the thickness of the cylindrical container is very thin. Therefore, in order to solve this difference, a high resolution, high frame rate camera 12 may be used.

Alternatively, it is possible to amplify this difference, so as to use video cameras 12 with lower resolution and lower frame rates.

Figure 5:
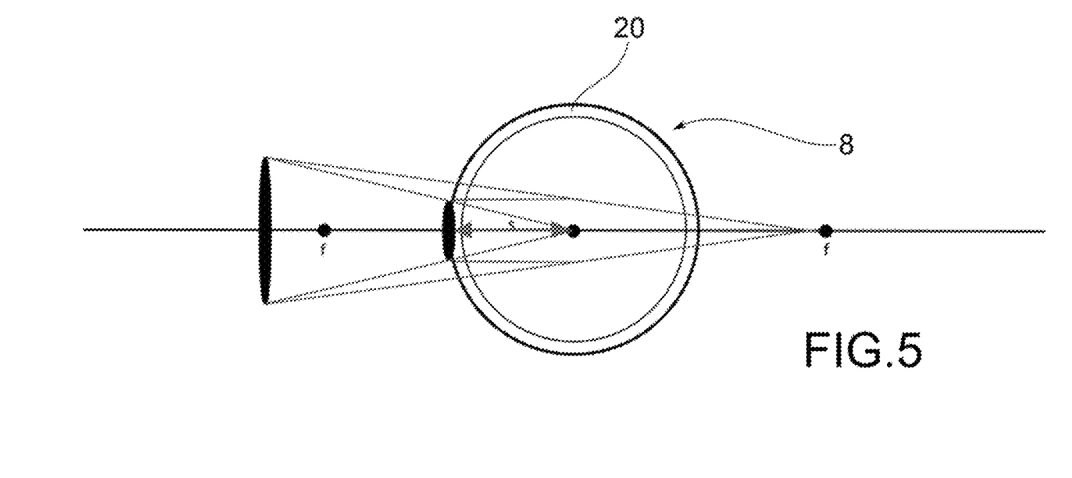
FIG. 5 shows a fourth schematization from above of an inspection apparatus according to the present invention, in successive inspection steps, as well as of the operating principles of said inspection apparatus, as better described below.

In particular (FIG. 5) to amplify the difference $\Delta Se - \Delta Si = (re-ri)*\Delta\theta$, the magnification due to the contained product was exploited. The magnification effect was therefore exploited:

$$M = f/(f-s)$$

With focal f of the lens (i.e. the cylindrical container 8 which acts as a lens) equal to:
$f = nl2/(nl-1)^2$ where nl is the refractive index of the viscous product contained in the cylindrical container 8.

The magnification obtained is equal to a factor of about 2.

Therefore, the focal plane of the video camera 12 is placed on the surface of the side opposite the video camera 12 itself, in such a way as to exploit the lens effect, due to the presence of any transparent product with a refractive index different from that of air.

There is therefore a trajectory on the opposite side 34 to the video camera 12 and a trajectory on the front side 38 with respect to the video camera: the trajectory 34 on the opposite side of the video camera 12 benefits from the magnification effect (lens) described above (FIG. 6).

The consequent magnification allowed the use of the system avoiding obstacles deriving from the need for video cameras 12 with higher resolution and therefore at lower frame rates, which could not meet the capture speed requirements necessary to track and follow every visible contaminant.

Therefore, only the trajectories inherent to the side of the container opposite the chamber are considered (FIG. 6).

As may be seen from the above description, the inspection apparatus and method according to the invention allow the drawbacks of the prior art to be overcome.

In particular, the present invention allows the contaminants present inside the container (unacceptable for the purposes of the test) to be detected, discriminating them from contaminants present outside the container (considered acceptable).

This implies a drastic lowering of the false rejections due to the detection of dirt, fibers and other which are not in contact with the pharmaceutical product as they are arranged outside the containers.

The "Spin and stop" approach cannot work as the liquid, being viscous or GEL, would not continue to rotate after the container stops. The contained particle would therefore not have a motion relative to the container itself after the latter has stopped. So the contaminants on the outside of the container would be as stationary as those inside in the liquid, the liquid being viscous or gel. A cosmetic approach, therefore with continuous rotation and rotating image acquisition, makes the contained contaminant detectable.

Since this process is able to distinguish the position, external or internal, of the contaminant, it allows containers with transparent or semi-transparent liquids that are either viscous or gel to be analyzed with a cosmetic approach, drastically reducing the false rejections due to external dirt.

Those skilled in the art may make several changes and adjustments to the inspection apparatus and methods described above in order to meet specific and incidental needs, all falling within the scope of protection as defined in the following claims.

The invention claimed is:

1. An apparatus for inspecting transparent, cylindrical containers containing transparent or semi-transparent viscous or gel products, in particular for medical applications, comprising:
    a support and/or gripping device for a cylindrical container, suitable for supporting it and provided with means for making it rotate about a vertical rotation axis, coincident with a cylindrical axisymmetry axis of said cylindrical container,
    a video camera directed so as to frame and capture images, in a form of pixels, of a window, the window being on a side wall of the cylindrical container,
    said side wall having a thickness equal to the difference between an outer radius, i.e. a radius of an outer surface of the side wall, with respect to the cylindrical axisymmetry axis, and an inner radius, i.e. a radius of an inner surface of the side wall,
    a lighting device, placed opposite the video camera with respect to the cylindrical container, so as to back-light said cylindrical container, opposite the video camera,
    a control unit operatively connected to the support and/or gripping device and to the video camera, and programmed to:
    control a rotation of the cylindrical container by means of the support and/or gripping device at constant angular speed around the vertical rotation axis,
    control the activation of the video camera so as to acquire 'n' images of said window, for a predetermined number 'n' of regular angular intervals, $\Delta\theta$, during the rotation of the cylindrical container,
    identify points of said images which can be detected as impurities,
    measure a median displacement, $\Delta Smed$, of each of said points during said regular angular intervals and compare the median displacement to a discriminating value equal to a product of an internal radius of the cylindrical container and said regular angular intervals,
    for each point of the identified points, classify the respective impurity identified by the point as external to the container if said median displacement of the point is greater than said discriminating value, and classify the respective impurity identified by the point as internal to the container if said median displacement of the point is less than said discriminating value.

2. The apparatus according to claim 1, wherein the control unit is operatively connected to the lighting device.

3. The apparatus according to claim 1, wherein the support and/or gripping device is provided with a rotary encoder to measure the rotation of the cylindrical container, said rotary encoder being operatively connected to the control unit to measure the median displacement of each of said points.

4. The apparatus according to claim 1, wherein the control unit is programmed to:
    place a focal plane of the video camera on the side wall of the cylindrical container opposite the video camera, i.e., on the side of the lighting device, in such a way as to exploit a lens effect, due to the presence, inside the cylindrical container, of any transparent product having a refractive index different from the refractive index of air.

5. The apparatus according to claim 4, wherein said lens effect is equal to $M=f/(f-s)$
    wherein $f=nl/2\ (nl-1)^2$ where nl is the refractive index of the transparent product contained in the cylindrical container,
    wherein 's' is equal to said outer radius,
    and wherein the video camera is placed at a distance 'f' from the cylindrical axisymmetry axis of said cylindrical container, opposite the lighting device.

6. The apparatus according to claim 4, wherein the control unit is programmed to measure only the trajectories inherent to points on the side of the cylindrical container opposite the video camera and facing the lighting device.

7. The apparatus according to claim 1, wherein said regular angular intervals are angular intervals of 0.05 sexagesimal degrees.

8. The apparatus according to claim 1, wherein the lighting device is a flat lighting panel.

9. A method for inspecting transparent, cylindrical containers containing transparent or semi-transparent viscous or gel products, in particular for medical applications, comprising the steps of:
    providing a transparent cylindrical container containing a transparent or semi-transparent viscous or gel product, supported so as to rotate around a vertical axis of rotation, coinciding with an axisymmetry axis of said container,
    providing a support and/or gripping device for said cylindrical container, suitable for supporting it and provided with means for making it rotate about a vertical rotation axis, coinciding with a cylindrical axisymmetry axis of said cylindrical container,
    providing a video camera directed so as to frame and capture images, in a form of pixels, of a window, the window being on a side wall of the cylindrical container, said side wall having a thickness equal to the difference between an outer radius, i.e. a radius of an outer surface of the side wall, with respect to the cylindrical axisymmetry axis, and an inner radius, i.e. a radius of an inner surface of the side wall,
    providing a lighting device, placed opposite the video camera with respect to the cylindrical container, so as to back-light said cylindrical container, opposite the video camera,
    controlling a rotation of the cylindrical container by means of the support and/or gripping device at constant angular speed around the vertical rotation axis,
    controlling the activation of the video camera so as to acquire 'n' images of said window, for a predetermined number 'n' of regular angular intervals $\Delta\theta$, during the rotation of the cylindrical container,
    identifying points of said images which can be detected as impurities,
    measuring a median displacement, $\Delta Smed$, of each of said points during said regular angular intervals and comparing the median displacement to a discriminating value equal to a product of an internal radius of the cylindrical container and said regular angular intervals, for each point of the identified points, classifying the respective impurity identified by the point as external to the container if said median displacement of the point is greater than said discriminating value, and classify the respective impurity identified by the point as internal to the container if said median displacement of the point is less than said discriminating value.

10. The method according to claim 9, comprising the step of placing a focal plane of the video camera on the side wall of the cylindrical container opposite the video camera, i.e., on the side of the lighting device, in such a way as to exploit a lens effect, due to the presence, inside the container, of any transparent product having a refractive index different from the refractive index of air.

11. The method according to claim 10, wherein said lens effect is equal to $M=f/(f-s)$ wherein $f=nl/2\,(nl-1)^2$ where nl is the refractive index of the transparent product contained in the container, where 's' is equal to said outer radius, and wherein the video camera is placed at a distance 'f' from the cylindrical axisymmetry axis of said cylindrical container, opposite the lighting device.

12. The method according to claim 10, wherein only the trajectories inherent to points on the side of the container opposite the video camera and facing the lighting device are measured.

13. The method according to claim 9, wherein said regular angular intervals are angular intervals of 0.05 sexagesimal degrees.

* * * * *